United States Patent [19]

Pellar et al.

[11] 4,149,183
[45] Apr. 10, 1979

[54] ELECTRONIC HALFTONE GENERATOR

[75] Inventors: Ronald J. Pellar; Leland D. Green, both of Sierra Madre, Calif.

[73] Assignee: Xerox Corporation, Stamford, Conn.

[21] Appl. No.: 688,669

[22] Filed: May 21, 1976

[51] Int. Cl.² ............................................. H04N 1/40
[52] U.S. Cl. ....................................... 358/75; 358/283
[58] Field of Search ................. 358/283, 298, 299, 75, 358/80

[56] References Cited

U.S. PATENT DOCUMENTS

| | | | |
|---|---|---|---|
| 3,294,896 | 12/1966 | Young | 178/5 |
| 3,436,472 | 4/1969 | Kyte | 178/6.7 |
| 3,911,480 | 10/1975 | Brucker | 358/75 |

Primary Examiner—John C. Martin
Attorney, Agent, or Firm—Irving Keschner

[57] ABSTRACT

Method and apparatus for scanning a document original, either black and white or color, and reproducing a corresponding halftone reproduction thereof either locally or at a remote location. A halftone signal is generated by pulse width modulating or comparing the scanned, or video, signal with a periodic signal having two frequencies and phases to create a dot pattern output which is a function of the frequency and phase of the two combined modulating signals. The halftone reproduction generated has variable dot configurations that are controllable to enable both rotation of the dot pattern (screen angle) and geometric modifications of the dot pattern. If the document original is in color, light of three different colors is caused to scan the document, each resultant video signal being processed in a manner as set forth hereinabove. In a preferred embodiment, different screen angles are utilized for each color that comprises the reproduction.

6 Claims, 13 Drawing Figures

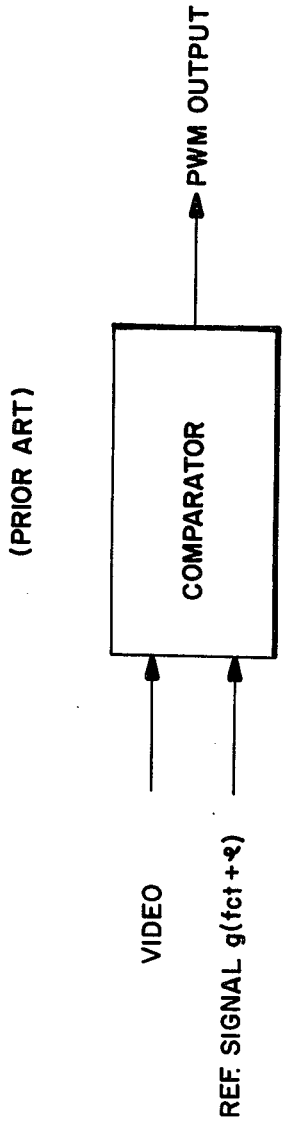

45° STANDARD SCREEN

45° "ELLIPTICAL" SCREEN

ELECTRONIC HALFTONE GENERATOR

BACKGROUND OF THE INVENTION

The printing process commonly used in industries which require reproducing graphic material, the newspaper and book publishing industries, for example, deposits a uniform density of ink on paper whenever it is desired to print all or a portion of an image and deposits no ink when the absence of an image is desired.

The all or nothing process poses no problem when alphabetical or other alphanumeric characters are printed. However, when pictures such as photographs are printed, the problem of reproducing the continuous tones (i.e. light gradations) arises. This problem has been solved by transforming the continuous tones in the original image into a halftone image which comprises a large number of ink dots of various sizes. This is referred to as "screening" and is performed by projecting the image through a fine mesh screen onto a photographic medium. When the largest dots and the spaces on the paper between the dots are made small compared with the visual acuity of the human eye, the dots and the spaces between the dots fuse visually in the screened image, the eye believing it is seeing continuous tones.

However, in an automated system in which electronic image reproduction forms at least part of the process of converting a continuous original image into a halftone image, the necessity for switching from electronic to photographic techniques in order to produce halftone is a factor which adds to the cost and complexity of the process. An electronic photocomposition system which obviates this problem is disclosed in U.S. Pat. No. 3,465,199. The system disclosed therein translates the tonal information on an original transparency into a corresponding image on the face of a cathode ray tube. The halftone images are recorded on film and thereafter may be processed into a printing plate by well known techniques. Another system which eliminates the aforementioned photographic technique is disclosed in U.S. Pat. No. 3,646,262 which also discloses means to vary the size or shape of the halftone dots formed on a photosensitive member. The aforementioned systems are primarily concerned with reproducing, as halftone, a black and white original. Color reproduction requires the reproduction of many different colors and shades. The multitude of colors is produced in conventional printing processes by the three subtractive primary colors, cyan, magenta and yellow. For high-quality reproduction a fourth ink, black, is also utilized. For large-volume reproduction of an original color pattern, there is prepared a set of halftone printing plates, with each carrying a halftone image of one color component of the original pattern. The original pattern is reproduced by overprinting with each printing plate so that the three printing inks visually combine to produce the correct colors.

The printing plates needed for color printing may be derived by scanning the original pattern in an electronic color scanner machine as set forth in U.S. Pat. No. 3,622,690. The color scanner typically scans the original pattern with light and measures the tones or color in the pattern by filtering the scanned signal with red, blue, and green color filters. The amplitudes of the filtered signals indicate the color content of the original pattern. Since the color printing inks are not spectrally perfect and hence do not correspond exactly to the three subtractive colors, the filtered signals are corrected for these deficiencies by means of color correction circuits in the color scanner. The color corrected signals are utilized to modulate the light emitted from a laser to produce continuous tone color separations of the original pattern. The continuous tone color separations are then screened photographically and further processed to prepare the halftone printing plates. Alternately, screened color separations are directly provided without requiring a separate photographic screening step.

Other halftone techniques utilize variations of character generation schemes whereby various elements of a two-dimensional matrix are turned on or off to create various dot patterns and characteristics. Alternate techniques deflect a CRT beam or laser beam in such a mannner as to draw dots of various shapes and characteristics. The dots are then repeated spatially to generate a halftone grid.

Prior art systems may incorporate electronic schemes which generate a horizontal or vertical line halftone, the scheme utilizing a pulse width modulation technique. In particular, a reference signal, which may be triangular, sine, cosine, waveform, depending upon the desired amplitude to pulse width conversion characteristics, is applied to a voltage comparator which compares the reference signal with a signal representing the tonal values of a scanned original. The comparator output may be coupled, for example, to a cathode ray tube to control spot size. The aforementioned Pat. No. 3,465,199 is an example of such a system. U.S. Pat. No. 3,916,096 discloses a technique for constructing a two-dimension halftone by using an electronic line screening technique. In particular, a single reference signal is amplified in separate, parallel channels. The amplified outputs are compared with a video signal in separate comparators, the screened video output being switched between comparator outputs thereby providing two different dot line widths. The system described in this patent provides, in essence, a line halftone and not a continuously varying two-dimensional spot. Although the screened video output pattern may be recorded on a reproduction device, limited control of the shape of the dots generated and the angular relationship of the generated dots in relation to the scanning direction is provided.

The line halftone techniques set forth hereinabove for converting continuous tone originals into halftones do not provide the reproduction details required in many applications. Further, it would be desirable to adapt electronic halftone techniques to directly reproduce, or copy, a black and white or color original document either locally or at a remote location. Although black and white, and recently, color copiers, are commercially available, the techniques utilized therein provide reproductions which although satisfactory for most purposes, are limited in some respects. In particular, reproduction of continuous tone, black and white and color originals have not provided the details required in certain applications.

It would be desirable, therefore, if two-dimensional electronic halftone techniques can be provided for black and white and color copying processes which allow the shape and characteristics of the halftone dots to be easily controlled, provides for electronic screen simulation and angular rotation thereof to reduce Moire' pattern effects, is economical and reliable and which provides a reproduction or copy whose tonal characteristics are a substantial replica of that in the original.

SUMMARY OF THE PRESENT INVENTION

The present invention provides method and apparatus for scanning a document original, either black and white or color, and reproducing a corresponding halftone reproduction thereof either locally or at a remote location. A halftone signal is generated by pulse width modulating, or comparing the scanned or video signal with a periodic signal having two frequencies and phases to create a two-dimensional, continuously varying dot pattern output which is a function of the frequency and phase of the two combined modulating signals. The halftone reproduction generated has variable dot configurations that are controllable to enable both rotation of the dot pattern (screen angle) and geometric modifications of the dot pattern. If the document original is in color, light of three different colors is caused to scan the document, each resultant video signal being processed in a manner as set forth hereinabove. In a preferred embodiment, the different screen angles are utilized and each color comprises the reproduction.

It is an object of the present invention to provide method and apparatus for scanning either a black and white or color original document and reproducing a corresponding black and white or color halftone image either locally or at a remote location.

It is a further object of the present invention to provide an electronic halftone generator which generates a halftone dot matrix which corresponds to a continuous tone original, the dots varying in size and shape in accordance with a predetermined periodic function.

It is still a further object of the present invention to provide an electronic halftone generator which utilizes a screening function which is periodic in time with dual frequencies and phases, the screening function allowing the characteristics of the two-dimensional dot grid which comprises the halftone pattern to be varied and the screen angle thereof to be rotated, the latter to avoid Moire' pattern problems inherent in using multiple screens.

It is a further object of the present invention to provide a two-dimensional grid of halftone dots wherein the dot characteristics can be varied by varying a screening function and wherein the halftone grid can be rotated relative to the input or output scanning direction.

It is still an object of the present invention to provide an electronic halftone generator for reproduction and/or display purposes which is operative in real time and requires no data storage.

It is an object of the present invention to provide method and apparatus for displaying an electrical signal representing an image or video information as a predetermined halftone grid pattern on a display device.

It is a further object of the present invention to provide method and apparatus for scanning a document original, either black and white or color, and reproducing a corresponding halftone reproduction thereof either locally or at a remote location. A halftone signal is generated by pulse width modulating, or comparing, the scanned or video signal with a periodic signal having two frequencies and phases to create a dot pattern output which is a function of the frequency and phase of the two combined modulating signals. The halftone reproduction generated has variable dot configurations that are controllable to enable both rotation of the dot pattern (screen angle) and geometric modifications of the dot pattern. If the document original is in color, light of three different colors is caused to scan the document, each resultant video signal being processed in a manner as set forth hereinabove. In a preferred embodiment, the different screen angles are utilized for each color that comprises the reproduction.

DESCRIPTION OF THE DRAWING

For a better understanding of the invention as well as other objects and further features thereof, reference is made to the following description which is to be read in conjunction with the accompanying drawings wherein:

FIG. 1 illustrates a pulse width modulator utilized in the prior art;

FIG. 2 illustrates the application of pulse width modulation techniques to line halftone generation;

DESCRIPTION OF THE PREFERRED EMBODIMENT

In order to illustrate the novel features of the present invention, a brief description of prior art electronic halftone dot generation techniques will be briefly set forth.

The majority of approaches use variations of character generation schemes whereby various elements of a two-dimensional matrix are turned on or off to create various dot patterns and characteristics. The patterns are then repeated to construct the halftone dot matrix. Other techniques deflect a CRT beam or laser beam in such a manner as to draw dots of various shapes and characteristics. The dots are then repeated spatially to generate the halftone dot matrix (grid).

The technique which is similar in some respects to the technique of the present invention is the application of pulse width modulation techniques to generate a horizontal or vertical line halftone. The pulse width modulation (PWM) technique is illustrated schematically in FIG. 1. The reference signal is a periodic function of time with frequency $f_c$. The reference waveform can be, for example, triangular, sine or cosine, in shape depending upon the desired amplitude to pulse width conversion characteristics. The frequency (clock) $f_c$ is generally a factor of two or more greater than the high frequency cutoff of the video signal to satisfy information and sampling theory criteria. The dynamic range (D.R.) of a system using a dot matrix halftone (dynamic range being defined as the ratio between maximum reflectivity [or brightness] to minimum reflectivity [or brightness] in the output excluding the complete absence of dots or lines) is given by the ratio of the clock period $T_P(1/f_c)$ to the minimum pulse duration ($t_p$) that can be tolerated and/or produced at the output, $$D.R. = T_p/t_p = (1/f_c t_p).$$

Figure 3:
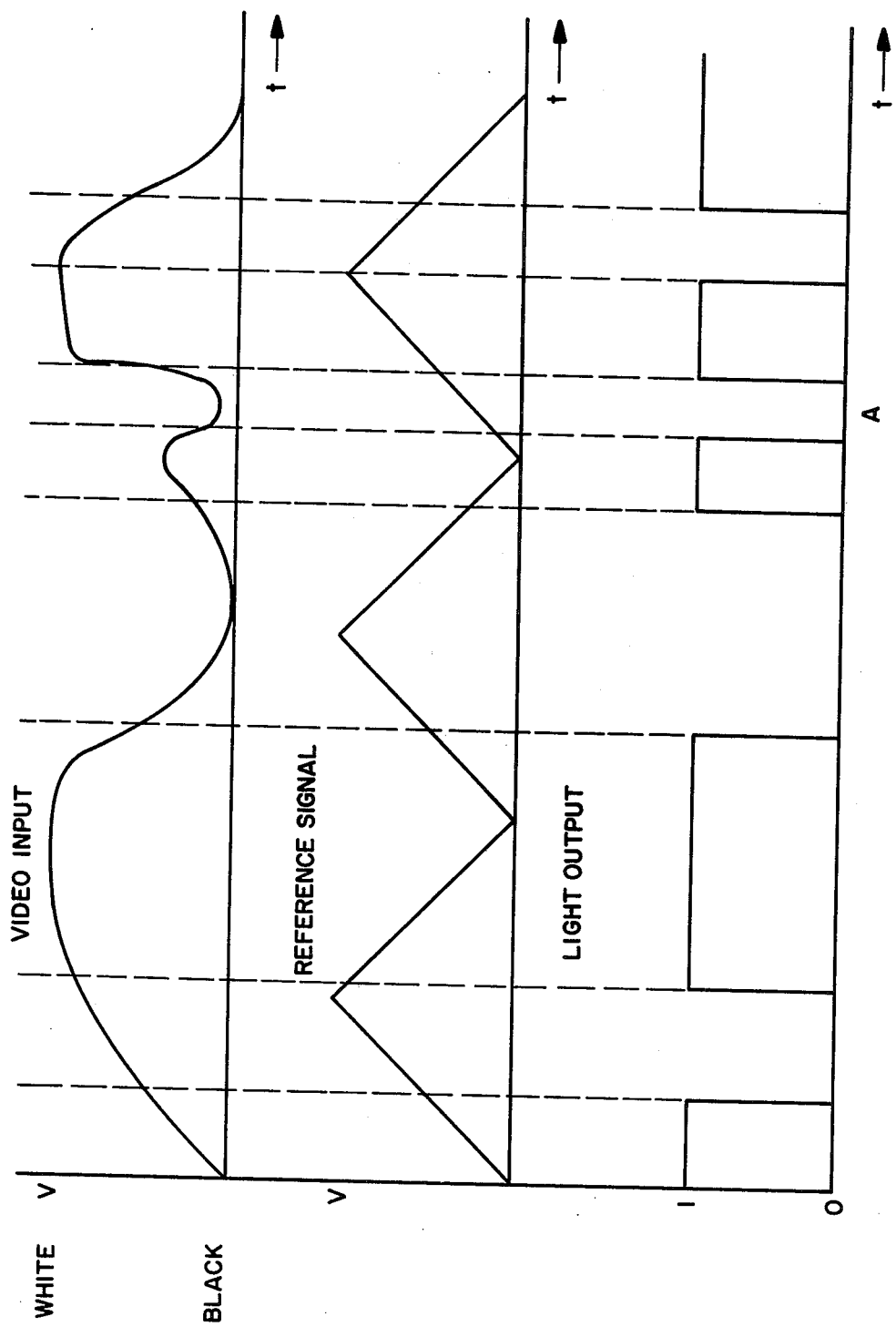
FIG. 3 is a line halftone time phase diagram.

The application of PWM to line halftone is schematically illustrated in FIG. 2 and is basically the same. The reference frequency is $$f_c = f_l v$$

where $f_l$ is the line halftone spatial frequency and v is the scan velocity in the appropriate direction (X or Y). The reference signal phase $\phi$ is adjusted to obtain proper alignment of the halftone line pattern. In general, the reference frequency is less than the high frequency cutoff of the video (particularly for line halftones oriented such that the lines are parallel to the X (high velocity) scan direction). The line halftone time phase diagram using a triangular reference is shown in FIG. 3. A light output is produced when the video input is greater than the reference signal for positive printing or display. This technique enables high frequency and high contrast video to be retained as shown at A in FIG. 3. The dynamic range is given by the ratio of the line spacing (l) to the minimum reproducible line width (d), i.e., $$D.R. = l/d = (1/f_l d)$$

The limited dynamic range and the general limitations of vertical or horizontal line halftone orientation is characteristic of the application of PWM prior art to halftone generation. As will be set forth hereinafter, the present invention increases the dynamic range of halftone systems while providing additional advantages such as screen rotation and dot shape selection using electronic techniques.

Figure 4:
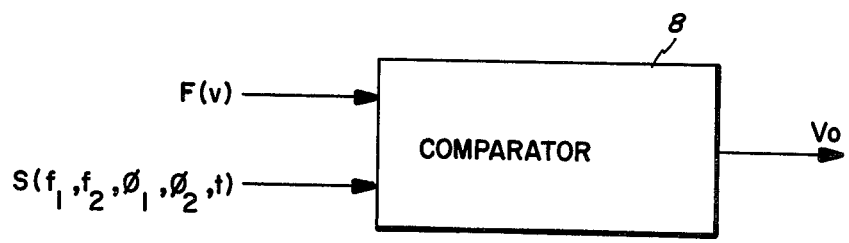
FIG. 4 is a simplified diagram illustrating the basic concept of the present invention.

FIG. 4 illustrates the basic concept of the present invention. (F(v) is a function of the input video and $S(f_1, f_2, \phi_1, \phi_2, t)$ is the screening function which, as will be set forth in detail hereinafter, provides for screen rotation and dot shape selection. The screening function is periodic in time with dual frequencies and phases. It is the dual frequency nature of the screening function which provides a significant improvement in capabilities over the line halftone technique described hereinabove. The normalized output of comparator 8 is defined as $$V_o = 1, F > S; V_o = 0, F < S$$

for direct output and $$V_o = 1, F < S; V_o = 0, F > S$$

for complimentary output. The direct output or complimentary output is the halftone signal to be used for reproduction and/or display with an output of 1 defined as white and an output of 0 defined as black. In the preferred embodiment the input and output scan techniques and devices are of a rectilinear X-Y nature.

However, this does not preclude the use of alternate scanning techniques, such as circular, spiral, etc. in the present invention. In X-Y scanning applications the frequencies are defined as $$f_1 = f_x = v/f_d; f_2 = f_y = v_y f_d$$

where $v_x$ and $v_y$ are the scan velocities in inches/sec in the X and Y directions respectively and $f_d$ is the spatial dot frequency desired in dots per unit length, i.e. dots/inch. The phase terms are defined by $$\phi_1 = \phi_x, \phi_2 = \phi_y$$

and provide proper synchronization of the halftone screen with the scanning devices. The phase terms can be dropped from further discussion since the phase (absolute) defines starting point (where scanning spots start from edge of the reproducing medium) determined, for example, by a scan start signal, without the loss of generality as long as the relative phase is maintained.

The condition for which the comparator switches states is given by $$S(f_x, f_y, t) = F(v)$$

and represents the locus of points defining the halftone dot shape. In particular, at the scanning point where S=F, the output $V_o$ changes from white to black or black to white. A series of scan lines, typically 7 or 8, builds up the actual dot. The screening function S determines characteristic dot shapes for uniform grey value inputs (F constant) whereas the video function F determines the grey value displayed and/or reproduced for various grey value inputs. The following are examples of halftone patterns produced for various screening functions:

(1) A screening function which is the linear sum of two triangular waves with frequencies $f_x$ and $f_y$, i.e., $$S(f_x, f_y, t) = T_1(f_x t) + T_2(f_y t)$$

will generate a halftone parallel to the X and Y scan directions having dots which are diamond shape for constant grey value input (a video signal of uniform intensity during the active portion of the scanning system and represents a uniform density or reflectivity or transmissivity of the scanned original). The tone reproduction curve (density in/density out) will have a gamma = 2 for $$F(v) = cv + d$$

and a gamma = 1 for $$F(v) = \sqrt{cv} + d$$

where c and d are arbitrary constants to match input and output white and black and characterize the electronic signal representative of the scanned original document.

(2) A screening function given by $$S(f_x, f_y, t) = T_1^2(f_x t) + T_2^2(f_y t)$$

will produce a halftone grid with characteristic dot shapes which are circles. The circles will merge for certain values of F(v) and the tone reproduction cure (TRC) is in general non-linear. However, an appropriate choice of F(v) can linearize the TRC.

From these examples it can be seen that appropriate choice of the screening function, S, and video function, F, can provide a wide variety of dot shape characteristics and TRC's.

Figure 5:
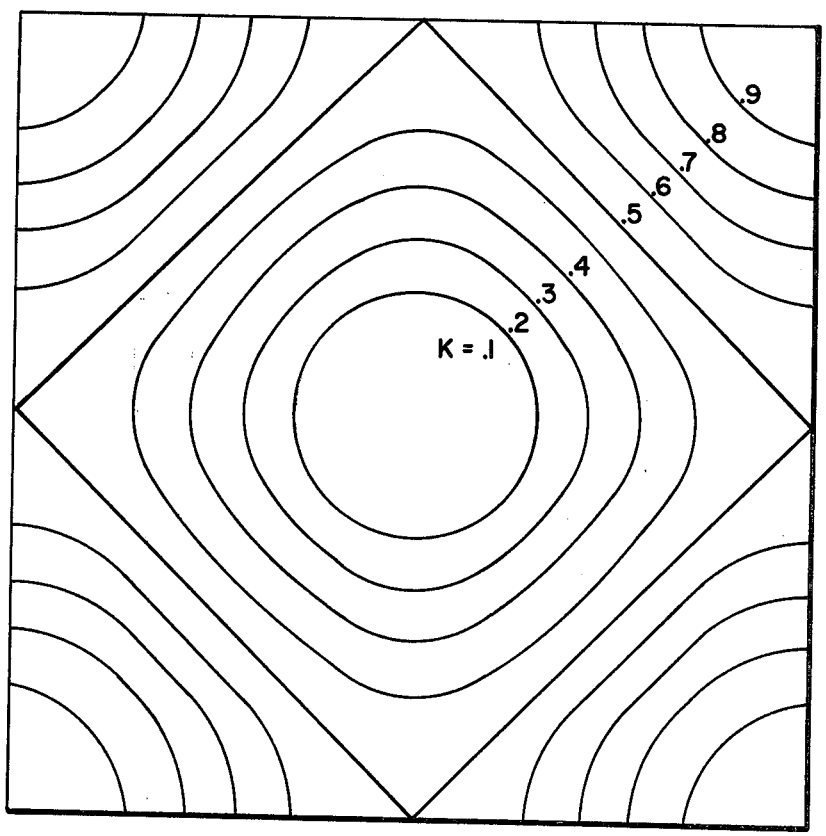
FIG. 5 illustrates characteristic dot shapes for a particular screening function.

The most useful screening function is a combination of sines and/or cosines waveforms as the dot shape characteristics will match those presently achieved in the photolithographic industry using optical contact halftone screens. The screening function $$a \cos 2\pi f_x t + b \cos 2\pi f_y t = F(v) \qquad (1)$$

will produce the dot shapes shown in FIG. 5 for various values of $K = F(v)/a$ and $a = b$. For a $\neq b$ the dot shape will expand or compress in one direction, without changing the dot frequency in either direction, thereby duplicating the characteristics of "elliptical" screens in the photolithographic industry. "Elliptical" screens have the effect of reducing visual contouring effects when the points of adjacent dots just touch. The constant "a" can represent the voltage or current gain in the electronics and the constant "b" can represent the D.C. offset voltage or current. The magnitude of these constants are determined at the input to the comparator by the peak-to-peak voltage and D.C. offset of the halftone reference signal and the halftone dot size desired in the highlight and shadow regions in the reproduction and/or display of the original document.

The above screen function produces a halftone grid defined as a 0° screen since the grid is parallel to the X or Y scanning directions. Screen angles other than 0° can be produced with the screening function $$S(f_x, f_y, t) = a \cos 2\pi(f_x \cos\theta + f_y \sin\theta)t + b \cos 2\pi(f_x \sin\theta - f_y \cos\theta)t \quad tm \quad (1a)$$

where $\theta$ is the desired screen angle. For $a = b$, a standard screen (for example, highlight and shadow data will be circular in shape) is produced and for $a \neq b$ an "elliptical" screen is produced whee the chaining direction, i.e., direction in which the adjacent dots first touch at midpoint grey, is either parallel or perpendicular to the screening direction $\theta$. If $\theta$ is $\pm 45°$ the above screening function simplifies to $$S = a \cos \sqrt{2}\pi(f_x+f_y)t + b \cos \sqrt{2}\pi(f_x-f_y)t = 2a \cos \sqrt{2}\pi f_x t \cos \sqrt{2}\pi f_y t + (b-a) \sin \sqrt{2}\pi f_x t \sin \sqrt{2}\pi f_y t \qquad (2)$$

for elliptical screens.

This simplifies further for a standard screen ($a=b$) to $$S = 2a \cos \sqrt{2}\pi f_x t \cos \sqrt{2}\pi f_y t \qquad (3)$$

and differs from 0° screens by a reduction in frequency of $\sqrt{2}$, a factor of 2 increase in gain, and multiplying the references instead of adding. It should be noted that screen rotation can be achieved with equation (2) as a starting point instead of equation (1), thereby reducing the frequency range required of the references ($f_x \cos\theta$, $f_x \sin\theta$, $f_y \cos\theta$, $f_y \sin\theta$) for certain ranges of $\theta$.

In general, the video function F(v) is selected to be a monotonically increasing or decreasing function of the input video. A monotonically increasing function is defined as a function of a variable which increases as the varible increases and decreases as the variable decreases without discontinuities within the varible range i.e. for $f=f(x)$, $df/dx>0$ and continuous for $x_1 \leq X \leq x_2$ where $x_1$ and $x_2$ define the range of monotonicity. A monotonically decreasing function is defined as a function of a variable which decreases as the variable increases without discontinuities over the variable range, i.e., $f=f(x)$, $df/dx<0$ and continuous for $x_1 \leq x \leq x_2$ where $x_1$ and $x_2$ define the range of monotonicity. For example, the function $f=x^2$ is a monotonically increasing function of x for all x greater than zero and is a monotonically decreasing function of x for all x less than zero; the function $f=x^3$ is a monotonically increasing function of x for all x. If g(v) is defined as a monotonically increasing function of video, then F(v) can be represented as $$c(g(v)+d) \text{ or } [c/(g(v)+d)]$$

where c and d are the constants as set forth hereinabove. The threshold conditions can then take the forms

|  | Case |
|---|---|
| $S(f_x, f_y, t) = c(g(v) + d)$ | I |
| $S - c(g(v) + d) = 0$ | II |
| $\dfrac{S}{g(v) + d} = c$ | III |
| $S = \dfrac{c}{g(v) + d}$ | IV |
| $S - \dfrac{c}{g(v) + d} = 0$ | V |
| $(g(v) + d)S = c$ | VI |

Figure 6:
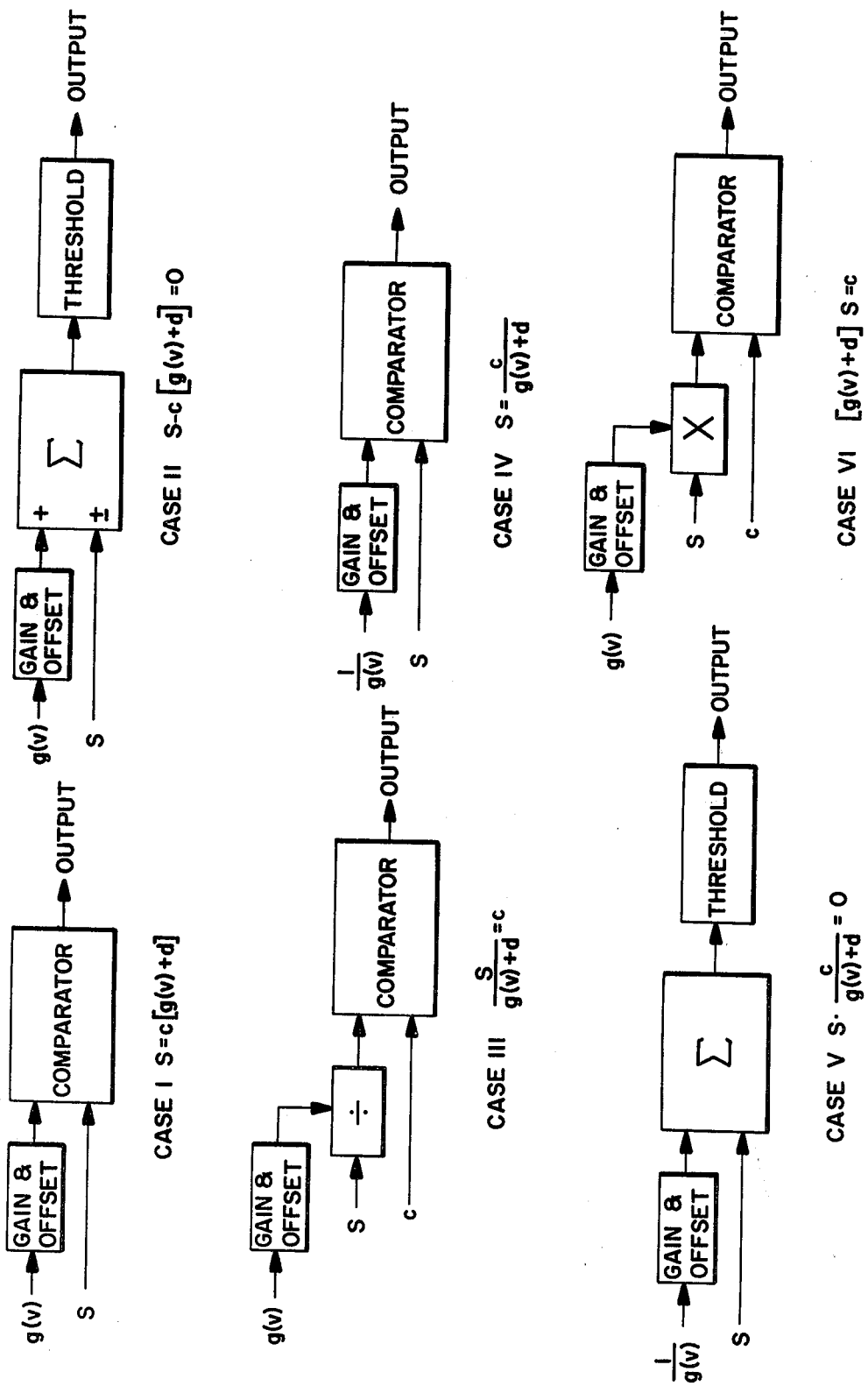
FIG. 6 illustrates alternate implementations of the electronic halftone generator of the present invention.

The implementation of these conditions are shown in simplified form in FIG. 6. The outputs will be positive or negative depending upon the Case. The complimentary outputs can be used or obtained if desired. The gain and offset need not be applied to g(v) but can instead be applied to $S(f_x, f_y, t)$ if desired without loss of generality. An electronic gain adjustment sets the constant "c" and the addition or subtraction of a D.C. offset voltage or current sets the constant "d". As set forth hereinabove, the actual settings are determined by the desired halftone characteristics in the reproduction and/or display (highlight and shadow dot sizes). Case's I, II, IV and V are sometimes referred to as additive screening. Case III is divisional screening and Case VI is multiplicative screening. Case VI is analogous to photolithographic techniques where g(v) is the negative or positive to be half-toned, S is the halftone screen, and c and d are analogous to bump and flash exposures ("bump and flash" are terms utilized to define the procedures used in the photolithography industry to adjust the halftone characteristics, i.e. highlight and shadow dot sizes). All the aforementioned cases are equivalent as far as dot shape characteristics are concerned and differ only in TRC corrections required in g(v) to obtain the desired result.

Figure 7:
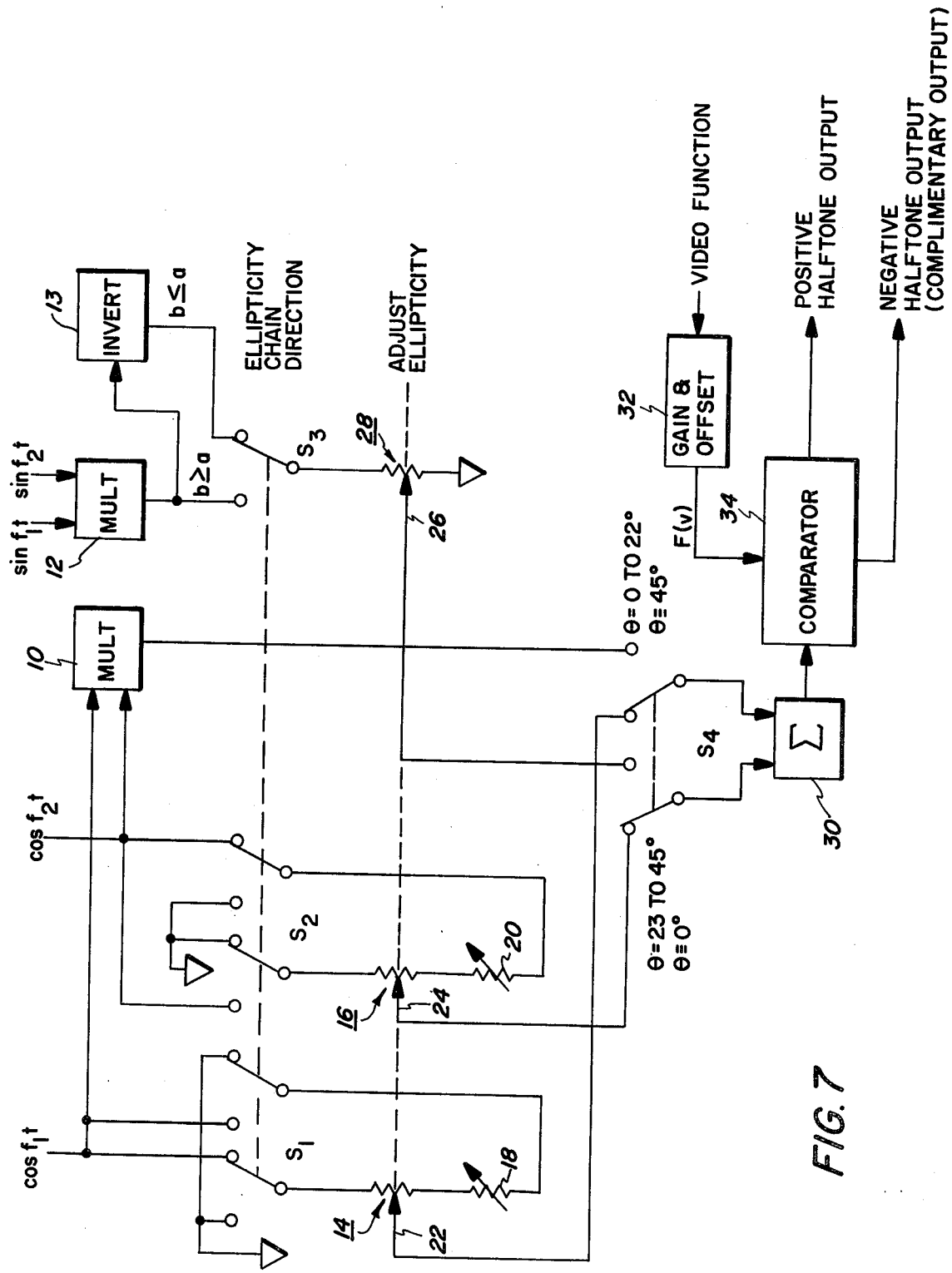
FIG. 7 is a simplified schematic of the electronic halftone generator of the present invention.

For purposes of illustrating the present invention, the Case I electronic implementation will be described hereinbelow. This simplified schematic diagram of the halftone generation for Case I is shown in FIG. 7 and incorporates both a 0° reference angle (implementation of equation (1)) and 45° reference angle (implementation of equation (2)) for screen angle rotation. The functions cos $f_1 t$, cos $f_2 t$, sin $f_1 t$ and sin $f_2 t$ may be generated by phase locked oscillators, digital synthesizers or an array of PROMS approximately programmed to generate the desired functions. Analog multipliers 10 and 12 generate 45° referenced waveforms. Multiplier 10 generates a standard screen by multiplying cos $f_1 t$ and cos $f_2 t$ and multiplier 12 provides ellipticity correction for the 45° screen. Ganged switches $S_1$, $S_2$ and $S_3$ determine the ellipticity chaining direction whereas ganged potentiometers 14 and 16 and variable resistors 18 and 20, respectively, adjust the amplitude of the screen functions referred to 0° for the amount of ellipticity. Resistor 18 is trimmed to equal the resistance of potentiometer 14 as determined by the setting of its adjustable tap 22 and resistor 20 is trimmed to equal the resistance of potentiometer 16 as determined by the setting of its adjustable tap 24. Adjustable tap 26 of potentiometer 28 adjusts the amount of dot ellipticity for screen functions referred to 45°. Switch S₄ selects 0° reference or 45° reference for appropriate screen angles. Summing amplifier 30 assembles the screen function and gain and offset device 32 adjusts the video function for appropriate maximum and minimum densities in the reproduced and/or displayed output, the adjusted video function being compared with the screening function in comparator 34. Adjustable taps 22 and 24 adjust the constants a and b in equations (1) and (1a) in such a way that a+b equals a constant such that the voltage values of white and black (0% and 100% relative dot area) as defined by the screening function are independent of the setting of taps 22 and 24. Taps 26 adjusts (b-a) in Equation (2), with "a" predetermined prior to the halftone generator, in such a way that voltage values of white and black (0% and 100% relative dot area) as defined by the screening function are independent of the setting of tap 26. This chaining direction switches $S_1$ and $S_2$ determine the condition $b \geq a$ or $b \leq a$ which establishes the direction of "chaining," i.e., the direction in which the halftone dots change size most rapidly with changes in video signal. The switch $S_3$ selects $(b-a) \geq 0$ or $(b-a) \leq 0$, i.e., $b \geq a$ or $b \leq a$ to establish the chaining direction.

The combination of multiplier 12, inverter 13, switch $S_3$ and tap 26 of potentiometer 28 determine $\pm(b-a)\sin f_1 t \sin f_2 t$ which is the second term in Equation (2). In particular multiplier 12 generates the product of $\sin f_1 t$ and $\sin f_2 t$, the inverter changes the sign of the product, i.e., plus to minus or vice versa, $S_3$ selects the appropriate sign for the chaining direction desired, and 26 and 28 determine the magnitude of $(b-a)$. $S_4$ in the position as shown in FIG. 7 selects the $\theta=0°$ case and all rotation angles referred to 0°, i.e. $\theta=23°$ to 45°. When $S_4$ is placed in the alternate position, the $\theta=45°$ and screen angles referred to 45°, i.e., $\theta=0°$ to 22° are selected. By having the 23° to 45° angles referred to 0° and the 0° to 22° angles referred to 45°, the inherent problems of generating a sine functions of a small angle, a very small value, and multiplying it with other values to obtain $f_1$ and $f_2$ can be obviated. The actual screen angles are determined by proper generation of the appropriate reference frequencies $f_1$ and $f_2$ such that $$\left. \begin{array}{l} f_1 = f_x \\ f_2 = f_y \end{array} \right\} \theta = 0°$$

Referring to Equation (1a)

$$\left. \begin{array}{l} f_1 = f_x \cos\theta + f_y \sin\theta \\ f_2 = f_x \sin\theta - f_y \cos\theta \end{array} \right\} \theta = 23° \text{ to } 45°$$

and referring to Equation (2)

$$\left. \begin{array}{l} f_1 = \dfrac{f_x}{\sqrt{2}} \\ f_2 = \dfrac{f_y}{\sqrt{2}} \end{array} \right\} \theta = 45°$$

Equation (3) gives:

$$\left. \begin{array}{l} f_1 = \dfrac{1}{\sqrt{2}} [f_x \cos(45°-\theta) + f_y \sin(45°-\theta)] \\ f_2 = \dfrac{1}{\sqrt{2}} [f_x \sin(45°-\theta) - f_y \cos(45°-\theta)] \end{array} \right\} \theta = 0° \text{ to } 22°$$

It should be noted that for the elliptical case, interchanging $f_1$ and $f_2$ and the left side of the above equations has the effect of interchanging the chaining direction, i.e., the switch positions of $S_1$, $S_2$, and $S_3$ in FIG. 7 are interchanged for a given chaining direction. The rotation angles that can be achieved are not limited to the above values but can be any angles. The above angle ranges $\theta 0°$ to 22° and $\theta=23°$ to 45° were cjhosen to ease the dynamic range requirements on $f_1$ and $f_2$ frequencies. The rotation angles are not limited to integer values as non-integer rotation angles can be implemented, e.g., $\theta=22.333°$ . . . .

Figure 8:
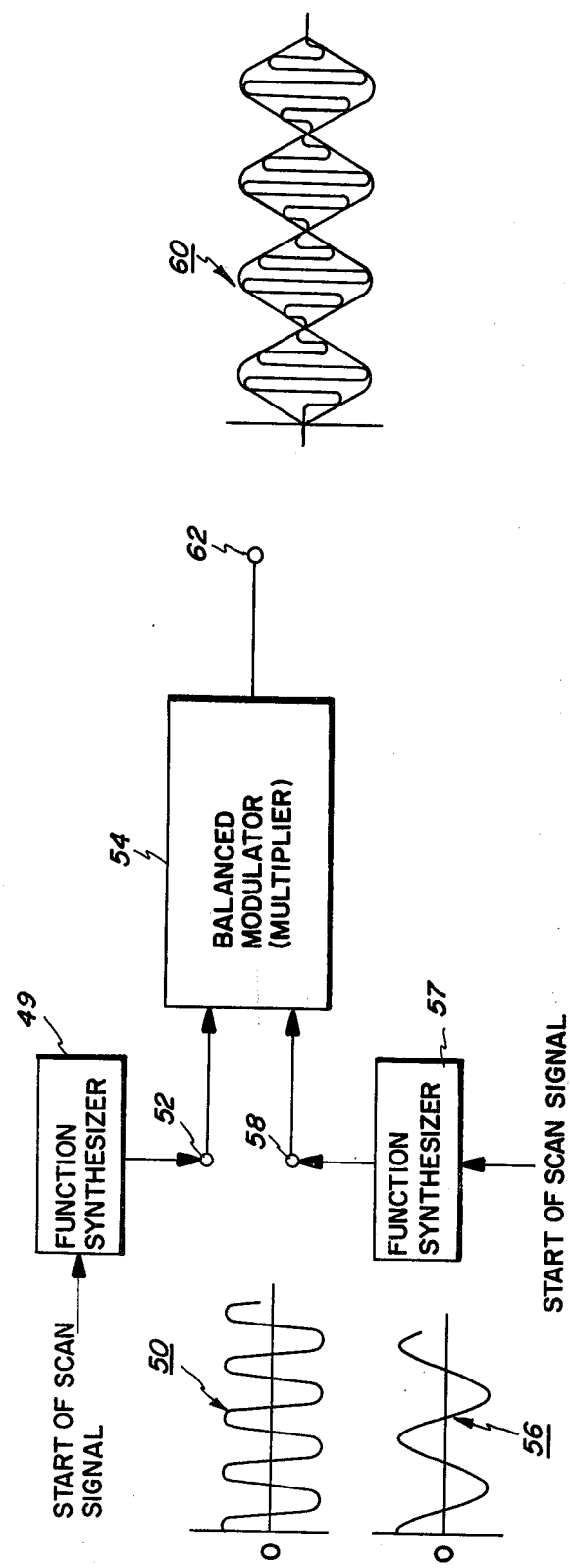
FIGS. 8–10 show a schematic diagram of one embodiment of the present invention for a fixed screen angle.
Figure 9:
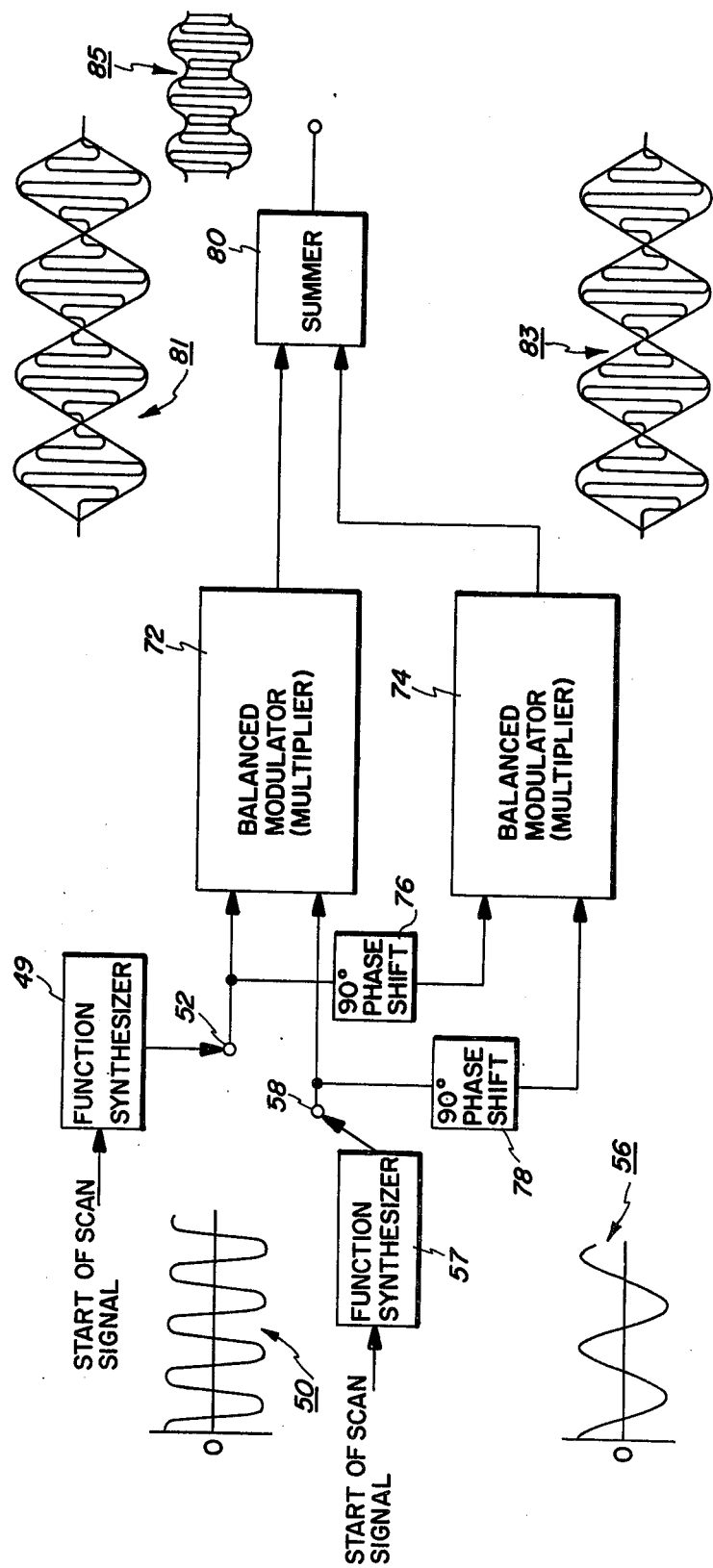
Figure 10:
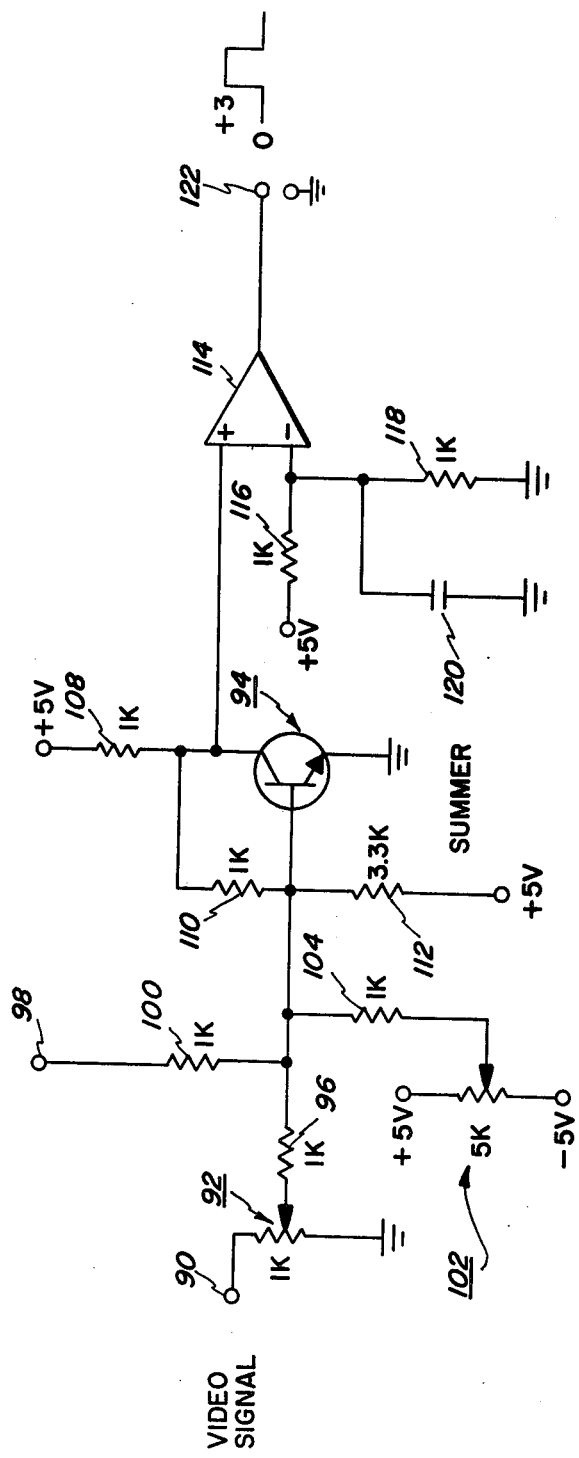

FIGS. 8, 9 and 10 show a particular implementation of Case II shown in FIG. 6 for a screen angle of 45°. In this case, $f_1=f_x/\sqrt{2}$ and $f_2=f_y/\sqrt{2}$. Assuming a desired spatial dot frequency of 100 dots per inch and a scan velocity $2.8 \times 10$ inches per second in the horizontal direction, $f_x=2.8$ MHz and $f_1=1.98$ MHz. For a scan velocity of 5.32 inches per second in the vertical direction and a dot frequency of 100 dots per inch, $f_y=532$ Hz and $f_2$376 Hz.

Typical dot frequencies are in the range from about 65 dots/inch to about 150 dots/inch (horizontal and vertical), typical values of fx are in the range of about 1MHz to about 6 MHz and typical values of fy are in the range of about 250 Hz to about 8 KHz (preferred ratio of fx to fy is $10^4$).

For a standard screen, the screening function is given by equation (3) hereinabove.

The cos $f_1 t$ signal 50 is applied to terminal 52 of balanced modulator 54 via function synthesizer 49, the modulator functioning as a four quadrant multiplier. The cos $f_2 t$ signal is applied to terminal 58 of modulator 54 via functon synthesizer 57. The output 60 appearing at terminal 62, the screen function desired, is a suppressed carrier double sideband signal which is coupled to a comparator for comparision with the input electrical signal. The output of the comparator may be applied to a modulator which provides an information containing optical signal which is coupled to an appropriate reproduction device. The device which synthesizes the $f_1$ and $f_2$ functions is synchronized by a start of scan signal (on the x-direction) from the reproduction device to initiate the waveform generation at the same time the scanning device starts to scan each line. The function synthesizer is also responsive to the number of times an original is being scanned such that, in a color reproduction mode, the screen angle can be varied for each scan of the original. For reproductions of a black and white original, the screen angle is maintained constant, preferably at 45°.

The function synthesizer, in the preferred mode, generates sine/cosine waveforms of variable frequency determined by the values of the screen angles as applied to the equations set forth hereinabove. A programmable waveform generator, such as the XR-205 Monolithic Waveform Generator, manufactured by Exar Integrated Systems, Inc., Sunnyvale, California, is typical of a precision function synthesizer which can provide a variable frequency signal output which is dependent upon a controllable input. Alternately, two separate wave generators can be provided to generate the required two separate frequencies, the frequencies desired being entered into the waveform (frequency) generators by, for example, external switches. For color scanning, a sequence selector can be provided to automatically select an appropriate output frequency from the waveform generator in accordance with the color being scanned (actually the selection is dependent on whether the original is being scanned the first, second or third time as will be explained hereinafter). Alternately, three pairs of waveform generators (six total) could be provided for three different screen rotations in the color scanning mode, a switch driven off the reproduction device) being provided to allow for the proper pair selection.

In order to modify the circuit of FIG. 8 to produce a non-standard screen (elliptical dots), the block diagram of FIG. 9 is utilized. The signals 50 and 56 are applied to balanced modulators 72 and 74, to the latter via 90 degree phase shifters 76 and 78, via function synthesizers 49 and 57. The outputs 81 and 83 from the modulators 72 and 74, respectively, are summed in summer 80 to produce the screening function 85 as set forth in equation (2) hereinabove. The values for constants "a" and "b" can be electronically controlled in the modulators or circuitry provided with the comparator as shown in FIG. 10. The degree of ellipticity depends on the ratio of the output signals from each modulator (or the difference in peak-to-peak amplitudes of the output of each modulator) 72 and 74. The output signal 85 from summer 80 is the elliptical, 45° screening function desired.

Figure 12:
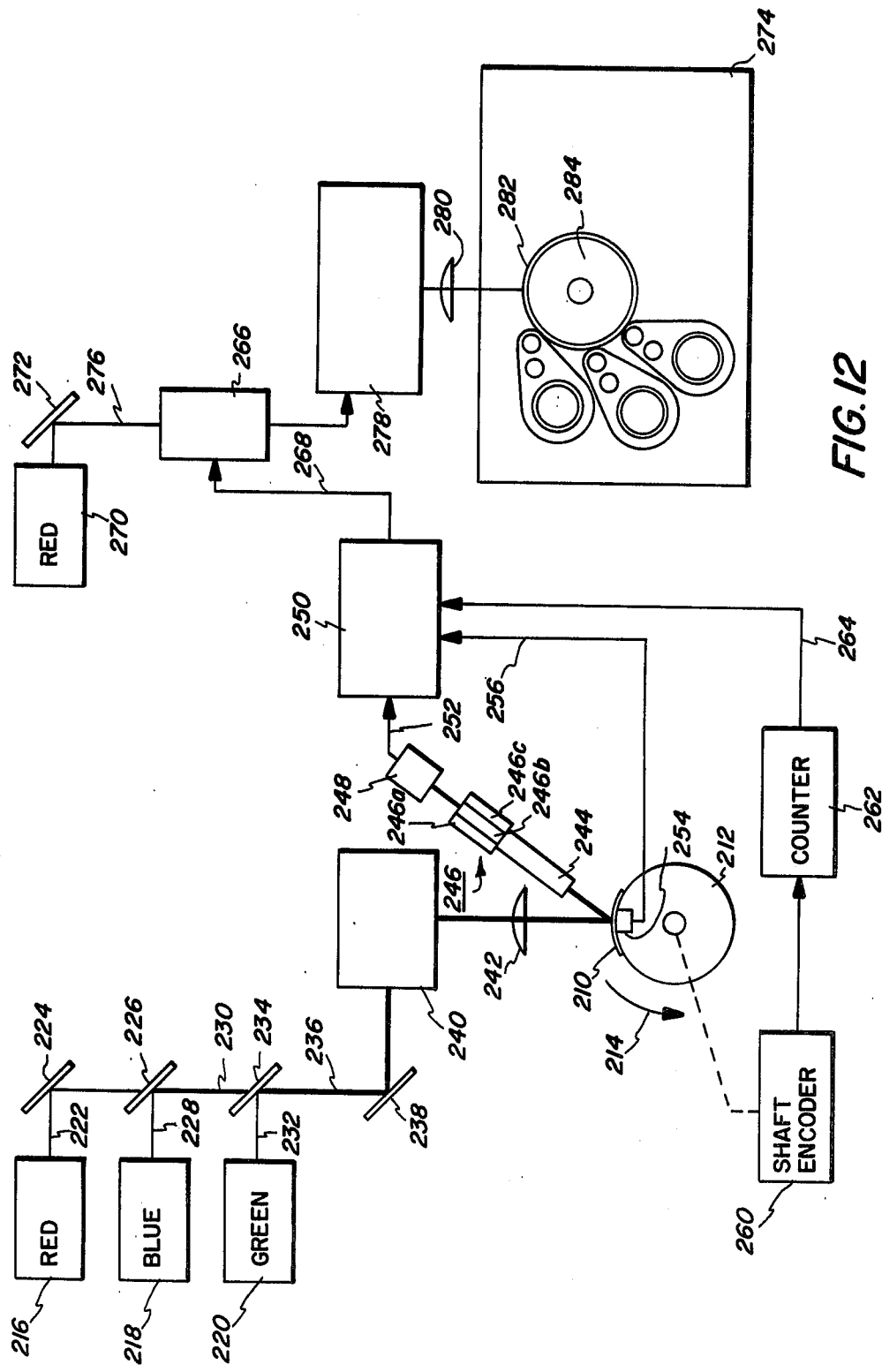
FIG. 12 is a block diagram illustrating a half-tone color reproduction system which utilizes the electronic halftone generator of the present invention.

FIG. 10 illustrates the comparator schematic circuit. The electrical analog input signal, such as a vido signal, is applied to input terminal 90, the gain thereof being controlled by potentiometer 92. The input signal is applied to the base of NPN transistor 94 via resistor 96. The screening function is applied to terminal 98 and to the base of transistor 94 via resistor 100. Potentiometer 102 and the 5 volt source applies offset currents to the transistor base via resistors 104 and 112 respectively. The currents appearing at the transistor base are summed and converted to a voltage by a summer amplifier circuit comprising transistor 94, load resistor 108 and feedback resistor 110 connected as shown. The summed voltage signal at the collector of transistor 94 is coupled to the non-inverting input of comparator 114. A threshold circuit, comprising a resistive divider circuit (resistors 116 and 118), the voltage source and capacitor 120 (acting as a filter) provides a threshold signal to the inverting lead of comparator 114. When the signal on the non-inverting input is greater than the signal on the inverting input, comparator 114 generates a variable width positive pulse (sliced video) at terminal 122 which varies from 0 volts to +3 volts in amplitude. The signal at terminal 122 is then applied to a modulator, as shown in FIG. 12, the modulator controlling the on-off times of the laser beam to provide the desired halftone reproductions.

Figure 11A:
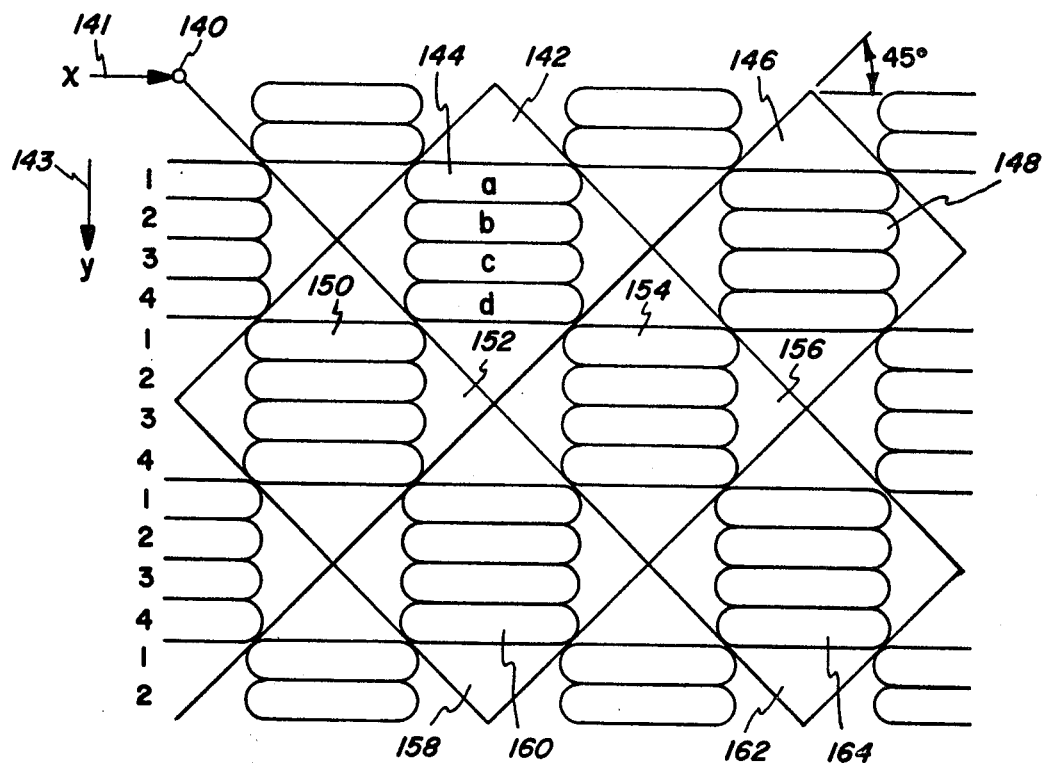
FIG. 11(a) shows a dot matrix for a 45° standard screen and FIG. 11(b) shows a dot matrix for a 45° elliptical screen.

FIG. 11(a) illustrates the generation of a portion of a 45° standard screen at the 50 percent gray point (corresponding to the dot K=0.5 in FIG. 5), the dots in the standard screen being symmetrical to adjacent dots both in the screening direction and orthogonal thereto. For purposes of illustration, the pattern generated is initiated at start point 140 which is synchronized with the scanning reproduction device utilized as described hereinafter with reference to FIG. 12. Reference arrow 141 indicates the direction of the x-scan and reference arrow 143 indicates the direction of the y-scan.

The dots 144, 148, 150, 154, 160 and 164 constructed for the 50 percent gray point illustrated are assumed for illustrative purposes, to comprise four scan lines, or rows, each. These dots are formed within diamond shaped halftone cells 142, 146, 152, 156, 158 and 162, respectively, each halftone cell being typically 10 mils on each side (for a 100 dot/inch screen frequency). The diamond shaped cell area (the outline of which is shown in the Figure) corresponds to the dot shape (K=0.5) of FIG. 5. It should be noted that for a screen pattern which represents full black, the dots shown would substantially fill its associated halftone cell and adjacent cells would be printed black (or in color for the color scanning mode). The 45° screen function causes the grid matrix illustrated to be reproduced by an emitting beam, such as a laser, coupled to a reproduction device such that a dot in cells 142, 146, 152, 156, 158 and 162 is produced. Referring more particularly to the construction of dot 144 for illustrative purposes, the first write, or laser scan, produces dot portion a, the second scan produces dot portion b, the third scan produces dot portion c and the fourth scan produces dot portion d, (the dot portions generally overlap). The pattern shown corresponds to mid-tone gray as those cells corresponding to the dots actually constructed would be printed as completely black (or in color for the color copying mode). As can be seen in the Figure (and FIG. 11(b) described hereinbelow), the direction of the dot portions (a, b, c and d) in each scanline is the same, i.e. in the direction of scan indicated by arrow 141. The alignment of the entire dots, which comprise all the dot portions (four in the example illustrated), is variable and controlled by the screening function utilized.

Although not shown, other dot configurations could also be constructed. For example, a circular highlight dot could be constructed by appropriate selection of the screening function (K=0.1, FIG. 5).

Figure 11B:
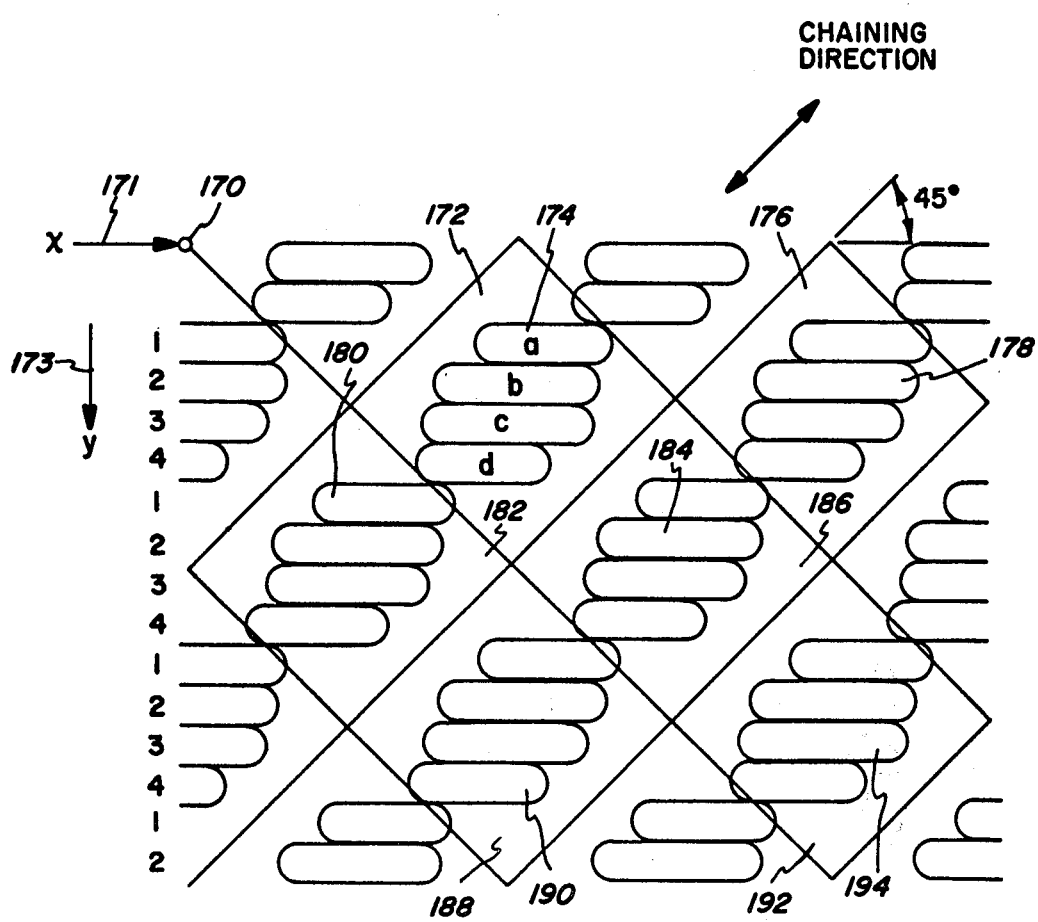

FIG. 11(b) illustrates the generation of a portion of a 45° non-standard (elliptical) screen grid using the circuit configuration of FIGS. 9 and 10. The dots generated in this grid by definition, are non-symmetrical to adjacent dots both in the screening direction and orthogonal thereto. For grays corresponding to highlight and shadow areas the dots constructed actually look like ellipses, hence the name for the non-standard screen. In the mid-tone range, the cell which defines the maximum dot area is not entirely printed as black (or in color for the color copying mode). For increased levels of gray, the dots shown in FIG. 11(b) will continue to increase in area until adjacent dots merge.

The scanning operation is initiated at point 170, the x-direction of scan being indicated by reference arrow 171 and the y-scan direction being indicated by reference arrow 173. The dots 174, 178, 180, 184, 190 and 194 generated are formed within a plurality of respective halftone cells 172, 176, 182, 186, 188 and 192 of a size, for example, as set forth hereinabove with reference to FIG. 11(a). As can be seen, the dot matrix forms a 45° angle to the x-direction of scan. Referring to half-tone cell 172 for illustrative purposes, the dot 174 generated comprises portions a, b, c, and d which may or may not overlap. The portions a, b, c, d of dot 174 may be considered to form the outline of an ellipse, the chaining direction of which is parallel to the screening direction. The dots in halftone cells 172, 176, 182, 186, 188 and 192 are similarly constructed to form the mid-tone pattern illustrated. In this situation, only two corners of a constructed dot are touching adjacent dots. For example, the corners of dot 184 touch the corners of dots 178 and 190 but no portion of dot 184 is touching dots 174 and 194. Other non-standard screens can be provided to provide alternate dot configurations using the teachings of the present invention.

Referring now to FIG. 12, a block diagram illustrating a color copying system in which the present invention may be utilized is shown. It should be noted that the present invention may be utilized in a black and white copying system wherein a laser having a single output wavelength may be utilized to scan an original and print a reproduction thereof on a laser sensitive medium. In this case, the screening angle is maintained constant for each line scan. An original document 210 is positioned on a rotating member 212 which, in the embodiment shown, is drum shaped. The document 210 is secured to the drum 212 by suitable means and the drum is caused to rotate in the direction of arrow 214. Original document 210 may be black and white or in color. The discussion set forth hereinafter will be directed to the scanning of a color document 210. Since the concept of the present invention is directed to scanning the original document 210 and reproducing a copy either set forth hereinabove with reference to FIG. 11(a). As can be seen, the dot matrix forms a 45° angle to the x-direction of scan. Referring to cell 174 for illustrative purposes, the elliptical dot generated comprises portions a, b, c, and d which may or may not overlap. The portions a, b, c, d of dot 174 forms the outline of an ellipse, the chaining direction of which is parallel to the screening direction. The dots in alternate cells 178, 180, 184, 190 and 194 are similarly constructed to form the mid-tone pattern illustrated. In this situation, only two corners of a constructed dot are touching adjacent dots. For example, the corners of dot 184 touch the corners of dots 178 and 190 but no portion of dot 184 is touching dots 174 and 194. Other non-standard screens can be provided to provide alternate dot configurations using the teachings of the present invention.

Referring now to FIG. 12, a block diagram illustrating a color copying system in which the present invention may be utilized is shown. It should be noted that the present invention may be utilized in a black and white copying system wherein a laser having a single output wavelength may be utilized to scan an original and print a reproduction thereof on a laser sensitive medium. In this case, the screening angle is maintained constant for each line scan. An original document 210 is positioned on a rotating member 212 which, in the embodiment shown, is drum shaped. The document 210 is secured to the drum 212 by suitable means and the drum is caused to rotate in the direction of arrow 214. Original document 210 may be black and white or in color. The discussion set forth hereinafter will be directed to the scanning of a color document 210. Since the concept of the present invention is directed to scanning the original document 210 and reproducing a copy either locally or at a remote location, document 210 is scanned to generate appropriate electrical (video) signals which represent the tonal (color) information on document 210. In particular, read lasers 216, 218 and 220 are provided, laser 216 comprising a helium-neon laser for generating red light, laser 218 comprising a helium-cadmium metal vapor laser for generating blue light and laser 220 comprising an argon-ion laser for generating green light. It should be noted that a properly excited helium-cadmium laser can provide light having wavelengths corresponding to both blue and green and therefore a single laser can be utilized in place of lasers 218 and 220. The light beam 222 from laser 216 is directed to a fully reflecting mirror 224 which directs the beam to mirror 226 which is transmissive thereto. Mirror 226 also reflects beam 228 generated by laser 218 so that resulting beam 230 comprises both red and blue light. The beam of light 232 generated by laser 220 is directed to mirror 234 which transmits beam 230 and reflects beam 232. The resulting beam 236 from mirror 234 combines the red, blue and green wavelengths generated by lasers 216, 218 and 220, respectively, and is incident on mirror 238. Beam 236, which is essentially white light, is directed via mirror 238 into input scanner 240 which may comprise a rotating multifaceted polygon. The scanning light from scanner 240 is directed to the document 210 via cylindrical lens 242 which has its plane of no power in the direction of scan. The light reflected from document 40 is collected by light pipe 244 which in turn directs the collected light to a detector 246 which comprises sections 246a, 246b and 246c which is responsive to the red, blue and green light, respectively, reflected from color document 210. The detected output is coupled to a color correction computer 248 for appropriate processing. Color correction computers are well known in the prior art (see U.S. Pat. No. 3,622,690, for example) and correct for the deficiencies in the developer powder (toner) and provides consecutively a plurality of electronic color separation signals therefrom corresponding to the colors yellow, magenta and cyan. As will be explained hereinafter with respect to the printer utilized, original document 210 is scanned three times to provide video signals corresponding to the three primary colors, color correction computer 248 thereafter being operated in a corresponding sequence to provide color corrections for the yellow, magenta and cyan developer powder. The color correction generated by color correction computer 248 is applied to the halftone electronic generator 250 of the present invention via lead 252. A start of scan detector 254 is provided adjacent document 210 to provide the required synchronizing signal to the electronic generator 250 via lead 256. The function synthesizers, utilized for generating sine/cosine waveforms, are gated by the start of scan signal to insure the same phase (i.e. phase equal to zero degrees in the x-scan direction) for each scan line. A shaft encoder 260 generates a pulse for each revolution of the drum, the pulse train generated thereby being coupled to counter 262 which counts three pulses and is reset thereafter. For color reproduction, the document 210 is scanned three times, once each to scan for the red, green and blue colors which comprise the document information. It should be noted that a fourth color, such as black, can be scanned and reproduced with an additional scan and screening function. Since it is desired to provide a different screen angle for each scan (a single screen angle can be used for black and white reproductions) the first pulse detected causes counter 262 to generate a signal on lead 264 which is coupled to electronic halftone generator 250. The function synthesizer therein generates an appropriate screen function having a first screen angle (relative to the x-direction of scan) therefrom. The second pulse detected, corresponding to the second document scan, causes counter 262 to generate a signal on lead 264 which causes the function synthesizer to generate a screen function having a second screen angle, different from the first screen direction. The third pulse detected by counter 262, corresponding to the third document scan, causes the function synthesizer to generate a screen function having at third screen angle, different from the first and second screen directions. For example, the first screen angle may be 0°, the second screen angle 22° and the third screen angle 45°. In this manner, an accurate color halftone reproduction of the original document 210 is produced by the reproduction device. In particular, the halftone signal is applied to an electro-optic modulator 266 via lead 268 to produce halftone separations of the document 210. The output beam from write laser 270 is also applied to modulator 266 via mirror 272. As will be explained in more detail hereinafter with reference to reproduction device, or printer 274, it is preferred that write laser 270 generate red light such as that generated by a helium-neon laser. The modulator 266 modulates laser beam 276 in accordance with the amplitude of the electronic signals derived from halftone generator 250. In general, when these signals are high, more light is passed by modulator 266 then when the signals are low. Consequently, the light transmitted through the modulator 266 is a function of the amplitude of the electronic signals on lead 268 and hence is a function of the density (color) of the tones on document 210. The light transmitted through the modulator 266 is applied to an output scanner 278 which is similar to input scanner 240 and is in synchronism therewith. The scanning light from output scanner 278 is focused by cylindrical lens 280 onto a photoconductive medium 280 formed on xerographic drum 284. The printer, generally labeled 274, in the preferred mode comprises the system disclosed in U.S. Pat. No. 3,854,449 modified to incorporate laser 270, modulator 266 and output scanner 278. The teachings of U.S. Pat. No. 3,854,449 necessary for the understanding of the invention are incorporated herein by reference. As set forth hereinabove, electronic halftone generator 250 provides the necessary signals to produce the required halftone dot matrix on the output copy. The particular circuitry utilized allows various shaped dots to be generated at variable screening angles to the scanning direction. With reference to FIG. 12, the scanning, or x direction, is in the direction perpendicular to the plane of the figure.

In operation, the reading lasers 216, 218, and 220 are turned on and the monochromatic light beams therefrom are merged into a single scanning beam 236 which is focused onto input scanner 240. The rotation of scanner 240 causes the scanning beam, focused by lens 242 into a fine spot, to scan the document 210. A number of scan lines are produced as drum 212 rotates in the direction of arrow 214. Each scan line produces varying amplitudes light signals due to the color content of the document 210 which light signals are transmitted and collected by light pipe 214 and detected by detectors 246a–246c. Detector 246a extracts the red light in the transmitted light beam and converts it to a varying electronic signal. The blue light in the scanning beam is extracted by detector 246b and the corresponding electronic signal is generated and detector 246c detects the green light in the scanning beam and converts it into an electronic signal. The color component signals from the detectors 246a–246c are applied to the color correction computer 248 to produce color corrected magenta, cyan and yellow output signals. These varying signals are applied to the modulator 266 via electronic generator 250 laser beam 276 derived from laser 270 also being applied thereto. Modulator 266 passes or inhibits the laser beam light in accordance with the amplitude of the electronic signal derived from the halftone generator 250. The output from modulator 266 is focused onto the xerographic drum 284 to expose photoconductor 282, the image being developed as set forth in U.S. Pat. No. 3,854,449. Since the modulated light is a replica of the corresponding color component in the original pattern formed on document 210, the hard copy output produced from the image on the drum 284 produces a halftone replica of the color tones in document 210.

Since the developing process in printer 274 requires three scaning cycles, document 210 in scanned three times by input scanner 240, output scanner 278 similarly scanning drum 284 three times in synchronism with the scanning of document 210.

Although the present invention has been described with reference to analog device implementations, the devices could be implemented digitally.

The invention described hereinabove has great versatility and many advantages over the prior art in producing electronic halftones for reproduction and/or display purposes. It provides a two dimensional grid of halftone dots where the dot characteristics can be altered through appropriate choice of screening function. The dot area is modulated by the video function thereby providing a greater dynamic range than line halftone techniques are capable of. With appropriate choice of screening frequencies and phases the halftone grid can be rotated relative to the input and/or output scan directions and with use of appropriate phase and/or frequency locking techniques the halftone grid pattern can be compensated for scan irregularities. Coordinate transformations techniques may be provided to allow the present invention (which produces rectilinear halftone grids) to be produced with spiral, circular, etc. input/out scan devices. Paralleling many of these circuits with appropriate time delay of the same screening function will allow the use of a different number of output channels than input channels for application to multiple channel scanning devices. The video function is not band limited by the screening function and output resolution for high contrast is not appreciably degraded. The output is binary and need not have any greater bandwidth than the input video function, thereby providing data compression for video format signals. The aforementioned advantages are accomplished in real time without any storage requirements.

As set forth hereinabove, the dynamic range of the line halftone technique is $$D.R. = 1/f_l w$$

where $f_l$ is the line halftone frequency in lines per unit length and w is the minimum reproducible line width. The invention described herein provides a dynamic range given by $$D.R. = K(1/f_d d_s)^2$$

where $f_d$ is the dot frequency in dots per unit length, $d_s$ is the diameter of the smallest reproducible dot, and K is a geometric area factor depending upon dot shape, K being $4/\pi$ for a circular dot. In general, the output scanner determines w or $d_s$ and for $w = d_s$, $f_l = f_d$, the dynamic range of the electronic halftone generator is the square of the dynamic range for line halftone, e.g., a line halftone capability of 8:1 will increase to 64:1 for dot halftone with the same output scan limitations. This represents a considerable improvement in performance.

The dual frequency and phase nature of the screening function allows for coordinate manipulation using frequency and/or phase modulation techniques. For example, proper choice of frequency and phase can produce a rotated halftone grid relative to an X-Y scanner. With appropriate frequency and/or phase modulation, coordinate transformation and stabilization can be achieved. For example, a rectilinear halftone grid can be produced with a spiral scan output by setting $$f_1 = v_r f_d \cos wt$$

$$f_2 = v_r f_c \sin wt$$

where $v_r$ is radial scan velocity and w is the angular scan velocity.

If the scan velocities have irregularities due to mechanical constraints or other causes which can be sensed then frequency and phase lock techniques can be applied to $f_1$ and $f_2$ to stabilize the halftone grid pattern.

In devices having input/output scanners of a multiple channel nature, the electronic halftone generator can be incorporated in each channel. The screening function is applied to each channel with an appropriate time delay between channels thereby registering the reference halftone grid.

Partial dots refers to the capability of modulating dot area within one halftone grid cell in conjunction with a rapidly changing density input in the video signal. The screening function allows a dot to change from black to white for example, in the middle of constructing the dot. The fact that the electronic halftone generator technique does not fundamentally limit the video function bandwidth guarantees partial dot capability.

The present technique inherently provides a data compression feature. In particular, the video function has a bandwidth of $\Delta f$ and an analog dynamic range of D. If the video functions were converted to digital format, the bit rate, B, would be at least $$B = 2f\Delta \log_2 D$$

The output of the electronic halftone generator is binary in nature with a minuimum bandwidth of $\Delta f$ and represents a bit rate of $$B = 2\Delta f$$

This would be a data compression factor of $\log_2 D$ except for the fact that the output pulses are duration modulated. However, dynamic range considerations yield a net compression factor, $C_d$ of $$C_d = \log_2 D/2$$

for digitally converted halftone output. Further data compression may be obtained through conventional techniques. In special applications were clocked bits are not required the full compression factor $$C_d = \log_2 D$$

can be realized.

In summary, the electronic halftone generator of the present invention converts electronic signals in video format to binary output halftone signals. Input devices providing video format signals can be TV scanners, laser scanners, flying spot scanners, video tape, computer constructed imagery, facsimile, etc. The output of the generator, being electronic in nature, can be used with output devices incorporating any number of marking and/or display technologies. Output scanners can be, for example, CRT, lasers, flying spot, LED and electronic matrix. The various applicable marking technologies may be photographic, xerographic, ink jet, electrophoresis, magnetographic, etc.

The electronic halftone generator has application to display purposes where additional dynamic range is needed and/or non-linearities in output brightness are difficult to compensate such, for example, as required in LED display systems, solid state matrix displays and specialized multichannel CRT's. The binary nature of the generator output does not require linear transfer functions for displays or marking technologies. All that is required of output devices is that they produce black or white (or appropriate colors in multi-color applications) displays.

The data compression aspect of halftones generation allows the device output to be combined with more conventional data compression techniques, providing reduced storage requirements. quirements, reduced transmission bandwidths or run lengths and reduced transmitter power.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. Apparatus for converting an electrical analog input signal representing an image into a corresponding output signal in the form of a dot pattern, said analog input signal being a video signal representing the optical density variations of an original color image comprising:

means for generating a time-varying electrical function, said time-varying function comprising a predetermined combination of a first periodic signal of a first frequency and a second periodic signal of a second frequency, said first frequency being independent of said second frequency, means for accepting said video signal as a series of successive scans during the generation of each dot which will form said dot pattern, means coupled to said generating means and said accepting means for comparing successive scans with said function and generating a difference signal when said function differs from said successive scans, and means responsive to said difference signal for providing an output signal in the form of dot pattern corresponding to said image, said output signal modulating a laser light beam to reproduce a color half-tone image on a laser sensitive medium.

2. Apparatus for reproducing an image as a half-tone pattern by electronically screening said image, said halftone pattern comprising a matrix of dots, said apparatus comprising:

first means for generating a video signal representing the optical density variations of an original color image, said video signal being generated as a series of successive scans during the generation of each dot which will form said dot matrix, second means for generating a time-varying electrical function, said time-varying function comprising a predetermined combination of a first periodic signal of a first frequency and a second periodic signal of a second frequency, said first frequency being independent of said second frequency, means coupled to said first and second generating means for comparing said successive scans with said function and generating a difference signal when said function differs from said successive scans, and means responsive to said difference signal for modulating a laser light beam to reproduce a color half-tone pattern in the form of said dot matrix on a laser sensitive medium.

3. A method for converting a video signal representing the optical density variations of an original color image into a corresponding output signal in the form of a dot pattern comprising the steps of:

generating a time-varying electrical function, said time-varying function comprising a predetermined combination of a first periodic signal of a first frequency and a second periodic signal of a second frequency, said first frequency being independent of said second frequency, accepting said analog signal as a series of successive scans during the generation of each dot which will form said dot pattern, comparing said successive scans with said function and generating a difference signal when said function differs from said successive scans, providing an output signal in the form of said dot pattern, and modulating a laser light beam with said output signal to reproduce a color half-tone image on a laser sensitive medium.

4. A method for reproducing a color image as a halftone pattern by electronically screening said color image, said halftone pattern comprising a matrix of dots, said method comprising the steps of:

generating a video input signal representing the optical density variations in said color image, said video signal being generated as a series of successive scans during the generation of each dot which will form said dot matrix, generating a time-varying electrical function, said time-varying function comprising a predetermined combination of a first periodic signal of a first frequency and a second periodic signal of a second frequency, said first frequency being independent of said second frequency, comparing said successive scans with said function and generating a difference signal when said function differs from said successive scans, and modulating a laser beam with said difference signal to reproduce a color half-tone image on a laser sensitive medium in the form of said dot matrix.

5. Apparatus for converting an electrical analog input signal representing an original color image into an output signal in the form of a dot pattern corresponding to said image comprising:

means for generating a time-varying electrical function which is a function of first and second signals of different frequencies, means for accepting said analog signal as a series of successive scan lines during the generation of each dot which will form said dot pattern, said analog signal being produced by sequentially scanning said color iamge in first and second directions, each sequential analog input signal representing the optical density variations of one color in the original color image, the direction of alignment of dots relative to said first direction of scan being different for each color being scanned, means coupled to said generating means and said accepting means for comparing said successive scans with said function and generating a difference signal when said function differs from said successive scans, means responsive to said difference signal for providing an output signal to generate said dot pattern, and means for scanning said output signal in directions corresponding to said first and second directions, the direction of alignment of the dots relative to said first direction of scan being controlled by said time-varying function.

6. A method for converting an electrical analog input signal representing an original color image into an output signal in the form of a dot pattern corresponding to said image comprising the steps of:

generating a time-varying electrical function which is a function of first and second signals of different frequencies, accepting said analog signal as a series of successive scans during the generation of each dot which will form said dot pattern, said analog signal being produced by sequentially scanning said color image in the first and second directions, each sequential analog input signal representing the optical density variations of one color in the original image, the direction of alignment of the dots relative to said first direction of scan being different for each color being scanned, comparing said successive scans with said function and generating a difference signal when said function differs from said successive scans, and providing an output signal, said dot pattern being generated by scanning said output signal in directions corresponding to said first and second directions, the direction of alignment of the dots relative to said first direction of scan being controlled by said time-varying function.

* * * * *